April 13, 1948.  F. W. GUIBERT ET AL  2,439,427
REPLACEABLE TOOTH STRUCTURE
Filed April 20, 1943
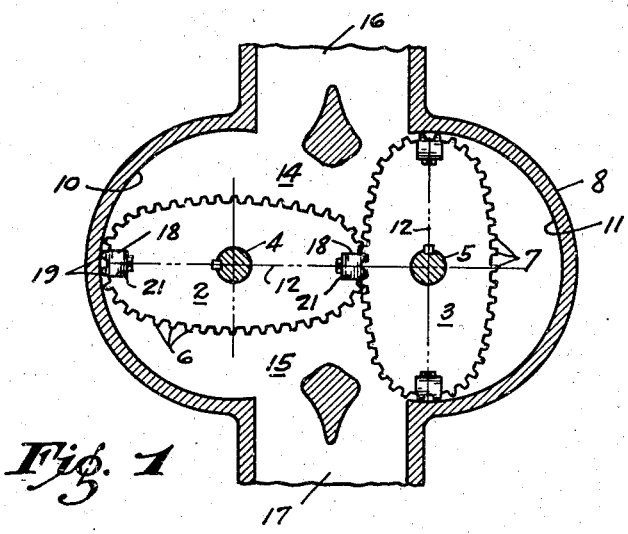
Fig. 1
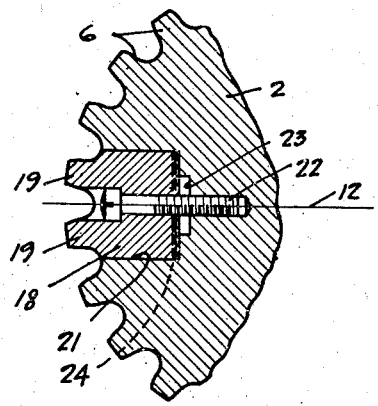
Fig. 2
Fig. 3
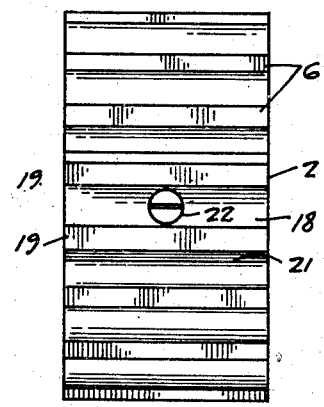
INVENTORS
Francis W. Guibert
Frederic B. Fuller
BY John Flam
ATTORNEY Patented Apr. 13, 1948

2,439,427

UNITED STATES PATENT OFFICE 2,439,427

REPLACEABLE TOOTH STRUCTURE

Francis W. Guibert, Los Angeles, and Frederic B. Fuller, Whittier, Calif.; said Fuller assignor to said Guibert Application April 20, 1943, Serial No. 483,758

2 Claims. (Cl. 74—460)

This invention relates to removable teeth for gears, particularly non-circular gears which are used as rotors in fluid handling apparatus, such as meters, gear pumps, and the like.

It is an object of this invention to increase the useful life of such gears.

It is still another object of this invention to provide means for compensating for excessive wear on certain teeth of a gear.

The use of generally elliptical gears in such apparatus is known; as an example thereof attention is invited to Patent No. 2,368,019 issued January 13, 1945. It will be apparent that, in the use of such gears, that portion of the periphery of the gear which forms a seal with the interior of the housing is not only of limited extent, but is in sealing contact with the housing during a large part of each revolution. Hence, the gear teeth on such portion are subject to rapid wear, as compared with the rest of the rotor teeth. At the same time it is essential that the efficiency of this seal be maintained. It is, accordingly, another object of this invention to provide means for maintaining the effectiveness of the seal between the rotor and the casing without replacing the rotor.

It is still another object of this invention to provide such a gear wherein the teeth subject to greater wear are formed on a removable insert, whereby the position of such teeth may be adjusted radially with respect to the axis of rotation of the gear to compensate for such wear, or the insert may be replaced when the teeth have become worn.

In addition to providing a removable insert for adjustment or replacement when worn, it is possible to form such an insert of appropriate wear-resisting material to prolong the life of the rotor. By the use of such an insert, only a small portion of the body of the gear or rotor, and a few of the gear teeth, are formed of such wear-resistant material. Thus, the cost, or the weight, or both, of the material used in the gear may be reduced, and the cost of cutting the teeth and other machinery may also be reduced. It is thus a still further object of the invention to provide an insert of wear-resisting material.

This invention possesses many other advantages, and has other objects which may be made more easily apparent from a consideration of one embodiment of the invention. For this purpose there is shown a form in the drawings accompanying and forming part of the present specification. The form will now be described in detail, illustrating the general principles of the invention; but it is to be understood that this detailed description is not to be taken in a limiting sense, since the scope of this invention is best defined by the appended claims.

Referring to the drawing:

Figure 1 is a longitudinal sectional view through a fluid handling apparatus employing non-circular rotors incorporating the invention;

Fig. 2 is a fragmentary detail longitudinal section of one of the rotors of Fig. 1; and Fig. 3 is an elevation of the rotor of Fig. 2, looking from the left.

In Fig. 1 of the drawing an apparatus which may be a fluid meter is shown by way of example, wherein the rotors comprise a pair of generally elliptical gears 2 and 3 mounted respectively on parallel rotatable shafts 4 and 5, and having a series of regularly spaced gear teeth 6 and 7 extending respectively about their entire peripheries. These gears 2 and 3 are so shaped that, as they rotate, their peripheries are always in contact, the teeth 6 and 7 thereon engaging adjacent the area of contact and forming a substantially fluid tight seal, at all times, between the rotors, as well as maintaining them in driving relation. The rotors are supported for rotation in a housing, or casing, which includes a pair of intersecting chambers or cylinders 10 and 11 of circular cross section and coaxial with shafts 4 and 5, respectively. Those portions of the peripheries of the rotors 2 and 3 which are adjacent the opposite ends of the long diameters, or major axes 12, are, respectively, in substantially fluid tight contact with the inner surface of cylinders 10 and 11, whereby passage of fluid between the housing and the rotors is prevented. Further, the housing contacts the sides of the rotors in a fluid tight manner.

Thus, the rotors serve to divide the housing into two compartments 14 and 15. One of these compartments, for example, 14, is provided with an inlet 16, and the other compartment with an outlet 17. The theory of operation of such apparatus is, in general, well understood, and, further, is set forth in considerable detail in the previously mentioned application. Accordingly, it will not be entered into at the present time. It is obvious that, to maintain reasonable efficiency of the device, and, in particular, the accuracy thereof as a meter, leakage between the compartments must be substantially prevented.

The number of teeth 6 or 7 at each end of the major axes 12, and in contact with the circular surface of cylinder 10 or 11, is very limited. Hence the wear on the teeth at these parts of the rotor peripheries is much more rapid than on those teeth on the rest of the peripheries; but, by providing means for compensating for such wear, the life of the rotor is greatly increased.

Accordingly, an insert 18 is provided for each end of the gears 2 or 3, and carrying a pair of teeth as 19 of the series 6 or 7. This insert or block 18 extends across the face of the gear and is detachably secured on the bottom of a parallel sided slot 21 in the gear or rotor body, as by one or more screws 22. Removal of this screw 22 permits removal of block 18; and, to facilitate such removal, the bottom of slot 21 is provided with a recess 23 to receive a screw device, or the like, for insertion under the block. Although block 18 may be replaced with a new one when teeth 19 become worn, it is the intention to raise the block slightly in its slot 21 and insert one or more shims 24 under it, as indicated by dotted lines of Fig. 2, to lengthen the teeth 19 by the necessary amount to maintain the seal.

As a convenient way of making such a rotor and the inserts, the rotor blank is first bored for the shaft and then slots 21 are milled out. The inserts 18, which have been finished on their sides and bottoms, are then secured in the slots 21, after which the series of teeth 6 or 7 are cut on the rotor and insert, and the rotor is otherwise finished as if it were a solid piece.

The inventors claim:

1. In a structure adapted to be subjected to fluid under pressure: a rotor having mutually perpendicular major and minor axes of symmetry and provided with teeth, each of which extend across the periphery of the rotor, and which are adapted to interengage with similar teeth on another rotor; a pair of inserts respectively at opposite ends of the major axis and each insert, including one or more teeth that serve to complete the required number of teeth on the periphery of the rotor; said rotor having parallel sided recesses opening into the periphey for the accommodation of said inserts, said inserts having sides co-operating with the recesses, each of said inserts also having an inner surface seating on the bottom of the respective recess, the depth of the recess determining the position of the teeth on the insert with relation to the other teeth on the rotor; and means co-operating with the bottom of the recesses for fastening said inserts tightly within the respective recesses.

2. In a structure adapted to be subjected to fluid under pressure: a rotor having mutually perpendicular major and minor axes of symmetry and provided with teeth, each of which extend across the periphery of the rotor, and which are adapted to interengage with similar teeth on another rotor; a pair of inserts respectively at opposite ends of the major axis, each insert occupying a space on the periphery of the rotor that corresponds to two teeth, said inserts serving to complete the required number of teeth on the periphery of the rotor; said rotor having parallel sided recesses that open in its periphery for the accommodation of said inserts; said inserts having sides co-operating with the recesses, each of said inserts also having an inner surface seating on the bottom of the respective recess, the depth of the recess determining the position of the teeth on the insert with relation to the other teeth on the rotor; and means for fastening said inserts tightly in the recesses, said means passing inwardly of the periphery of the rotor into and through the inserts and respectively co-operating with the bottom of the coreponding recess.

FRANCIS W. GUIBERT.
FREDERIC B. FULLER.

REFERENCES CITED

The following references are of record in the file of this patent:

UNITED STATES PATENTS

| Number | Name | Date |
|---|---|---|
| 408,435 | Redington | Aug. 6, 1889 |
| 688,616 | Ferguson | Dec. 10, 1901 |
| 799,677 | Schluter | Sept. 19, 1905 |
| 921,008 | Scherling | May 11, 1909 |
| 924,773 | Hanman | June 15, 1909 |
| 1,506,642 | Iler | Aug. 26, 1924 |
| 2,176,812 | Glenn | Oct. 17, 1939 |

FOREIGN PATENTS

| Number | Country | Date |
|---|---|---|
| 1,825 | Great Britain | 1791 |
| 2,402 | Great Britain | 1857 |
| 413,170 | Great Britain | July 12, 1934 |
| 846,352 | France | June 5, 1939 |